US008971876B1

(12) United States Patent
Hunter et al.

(10) Patent No.: US 8,971,876 B1
(45) Date of Patent: Mar. 3, 2015

(54) METHOD AND SYSTEM FOR AUTOMATICALLY CUSTOMIZING A DEVICE BASED ON THE COMPANY FOR WHOM THE DEVICE-USER WORKS AND BASED ON THE JOB OF THE USER AT THE COMPANY

(75) Inventors: Kevin E. Hunter, Olathe, KS (US); Pujan Roka, Olathe, KS (US); Brian J. Finnerty, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2488 days.

(21) Appl. No.: 11/501,589

(22) Filed: Aug. 9, 2006

(51) Int. Cl.
*H04W 4/00* (2009.01)
(52) U.S. Cl.
USPC ...... 455/432.3; 455/418; 455/419; 455/422.1
(58) Field of Classification Search
CPC .......................... H04M 1/274516; H04W 4/00
USPC ............................. 455/418, 419, 422.1, 432.3
See application file for complete search history.

(56) References Cited

U.S. PATENT DOCUMENTS

| 6,549,770 | B1 | 4/2003 | Marran |
| 6,892,228 | B1* | 5/2005 | Penders ........................ 709/219 |
| 6,963,635 | B1 | 11/2005 | Jones |
| 7,143,149 | B2* | 11/2006 | Oberg et al. .................. 709/220 |
| 7,487,233 | B2* | 2/2009 | Iwamoto et al. .............. 709/223 |
| 2003/0096621 | A1* | 5/2003 | Jana et al. ..................... 455/456 |
| 2003/0134614 | A1 | 7/2003 | Dye |
| 2003/0181223 | A1 | 9/2003 | Lee et al. |
| 2004/0148343 | A1 | 7/2004 | Mottes |
| 2004/0162058 | A1 | 8/2004 | Mottes |
| 2005/0071448 | A1* | 3/2005 | Katz et al. ..................... 709/223 |
| 2005/0075115 | A1* | 4/2005 | Corneille et al. .......... 455/456.3 |
| 2005/0079863 | A1 | 4/2005 | Macaluso |
| 2005/0080875 | A1 | 4/2005 | Jethi et al. |
| 2005/0114534 | A1 | 5/2005 | Lee |

(Continued)

FOREIGN PATENT DOCUMENTS

| EP | 1 705 872 | 9/2006 |
| WO | WO 2005/020027 A2 | 3/2005 |

OTHER PUBLICATIONS

International Search Report and Written Opinion from International Application No. PCT/US2008/053586, dated Aug. 11, 2008.

(Continued)

*Primary Examiner* — Patrick Edouard
*Assistant Examiner* — Michael Irace

(57) ABSTRACT

A method of customizing a device in accordance with the company for whom the device-user works and in accordance with the job held by the user at the company. A provisioning system receives a request to provision (e.g., activate) a device and responsively determines the company at which the device-user works and the job held by the user at the company. The provisioning system then establishes customization-data usable by the device to become customized in a manner corresponding with the company and job, and the provisioning system sends the customization-data to the device to cause the device to become customized accordingly. This process can be applied to automatically customize a device so as to adopt a base user-interface, functionality, and reference data that is all related to the company at which the device-user works and that is tailored in a manner appropriate to the user's job at the company.

17 Claims, 4 Drawing Sheets

(56) References Cited

U.S. PATENT DOCUMENTS

| | | | |
|---|---|---|---|
| 2005/0229001 A1* | 10/2005 | Brown et al. | 713/182 |
| 2005/0233767 A1* | 10/2005 | Ayyeppen et al. | 455/557 |
| 2006/0030315 A1* | 2/2006 | Smith et al. | 455/432.3 |
| 2006/0035631 A1 | 2/2006 | White et al. | |
| 2006/0116507 A1 | 6/2006 | Oppermann et al. | |
| 2006/0184508 A1* | 8/2006 | Fuselier et al. | 707/3 |
| 2008/0212503 A1 | 9/2008 | Lipford et al. | |

OTHER PUBLICATIONS $3^{rd}$ Generation Partnership Project "Stage 1 Service Requirement for the 3GPP Generic User Profil (GUP)," Release 6, Sep. 2002.

U.S. Appl. No. 10/946,293, filed Sep. 21, 2004 entitled "Method and System for Customizing a Wireless Device's User-Interface Based on Which Vendor Distributed the Wireless Device".

Office Action from U.S. Appl. No. 10/946,293, dated May 9, 2006.

* cited by examiner

METHOD AND SYSTEM FOR AUTOMATICALLY CUSTOMIZING A DEVICE BASED ON THE COMPANY FOR WHOM THE DEVICE-USER WORKS AND BASED ON THE JOB OF THE USER AT THE COMPANY

FIELD OF THE INVENTION

The present invention relates to wireless communications and, more particularly, to customization of wireless devices or, for that matter, other devices.

BACKGROUND

Cellular wireless, like other forms of wireless communication, is an increasingly popular means of personal communication in the modern world. Consumers use cellular wireless networks for the exchange of voice and data over cellular telephones, PDAs, cellular telephone modems and other devices. In principle, a user can communicate over the Internet or call anyone over the Public Switched Telephone Network (PSTN) from any place inside the coverage area of the cellular wireless network.

In a typical cellular wireless system, an area is divided geographically into a number of cell sites, each defined by a radio frequency (RF) radiation pattern from a respective base transceiver station (BTS) tower. Each BTS in a cell is in turn coupled with a base station controller (BSC). And the BSC is then coupled to or functionally integrated with a switch (e.g., a mobile switching center (MSC)) and/or gateway (e.g., a packet data serving node (PDSN)) that provides connectivity with a transport network such as the PSTN or a public or private IP network (e.g., the Internet).

When a wireless device, such as a cellular phone or a Personal Digital Assistant ("PDA") is positioned in a cell, the wireless device may communicate via an RF air interface with the BTS of the cell. A communication can thus be established between the wireless device and another entity on the transport network, via the air interface, the BTS, the BSC and the switch or gateway.

Before a wireless device can engage in cellular or packet-data communication, the wireless device must be activated for service within a cellular service provider's network. Activation can be carried out at the point of sale, such as at a retail store where the user buys the wireless device and subscribes to service. In that scenario, a sales technician may collect subscriber billing information such as name, address and credit card number, and establish an account for the user of the device. The service provider may then assign a Mobile Identification Number (MIN), username and other activation data to the device and record that data in connection with the user's account, and the technician may program that data into the device for later use.

Alternatively, the activation process can be carried out over the air. An Over-The-Air Service Provisioning (OTASP) feature gives wireless service providers the ability to provision a wireless device remotely over the air interface instead of activating the devices at the point of sale. OTASP also allows providers to then modify an activated device's network parameters over the air, directly from the network.

To activate an OTASP-capable wireless device, a user may make a call to a service provider's customer service center, usually by dialing a service-provider-specific feature code and appropriate supplementary digits. The feature code results in the establishment of a voice call between the user and the service provider's customer service center. Subscriber billing information, such as a credit card number or mailing address, may be obtained before the customer service center starts the OTASP procedure.

Once the call to the customer service center is established, the wireless device's Electronic Serial Number (ESN) is supplied to the service provider's network. Then, an entity in the service provider's network will upload some Number Assignment Module (NAM) parameters from the wireless device. The NAM is a set of MIN and IMSI-related parameters that are stored in the wireless device's memory and used for mobile identification. The customer service center may also request that the wireless device upload other configuration parameters, such as mobile protocol and software versions, and any preferred roaming lists, if available. Then, if required, the service provider's network and the wireless device will exchange Authentication Key Generation parameters and generate an A-key. The A-key is used as a secure input during the mobile authentication process. After the A-key has been successfully generated, a Shared Secret Data (SSD) update procedure is performed. The purpose of the SSD update is to synchronize the SSD value stored in both the wireless device and an authentication center in the service provider's network. Like the A-key, the SSD value is used during the authentication process.

If the wireless device fails authentication, the wireless device may be denied service by the service provider, and the activation process will be terminated. If the wireless device is successfully authenticated by the customer service center, the service representative will perform the following: (i) assign a MIN to the wireless device; (ii) determine subscriber service needs; (iii) create a subscriber profile record in the service provider network's activation data base; and (iv) assign other NAM parameters needed by the wireless device.

Then, the service provider's network will transmit the required NAM parameters to the wireless device over the air interface. Thus, if the activation is successful, the wireless device or a signal received from the service provider's network may provide validity feedback to the user indicating that activation was completed successfully. If activation was completed successfully, cellular service can then begin for the wireless device.

In addition, a wireless device that is capable of engaging in packet-data communication (e.g., IP communication) may have a username and password that the device can use to gain packet network connectivity and to engage in packet-data communication. Typically, the username will be assigned by the wireless carrier and will be programmed into the wireless device. The username may take the form of a Network Access Identifier (NAI), and the password may be a predefined hash based on the device's unique ESN.

When such a wireless device seeks to gain packet network connectivity, typically after the device first acquires RF connectivity, the device may programmatically send into the carrier's network a message that carries the device's username and password, among other information. An authentication server or other entity in the carrier's network may then validate the username/password (e.g., ensuring that the password is correct, and ensuring that the username is not already in use on the network) and, upon successful validation, may assign an IP address for the device to use. The device may then commence packet data communication via the carrier's network.

U.S. patent application Ser. No. 10/946,293, filed Sep. 21, 2004, contains additional disclosure that can be applied by analogy to facilitate implementation of the present invention and is therefore incorporated herein by reference in its entirety.

SUMMARY

The present invention provides a method and system for automatically customizing a wireless device based on the company for whom the device user works and based on the job of the user at the company. With the benefit of the invention, wireless devices (or other devices for that matter) can be automatically customized to take on a look and feel that corresponds with a particular company, and the look and feel can be further automatically tailored for a particular end-user based on the job that the end-user holds at the company. This customization can be carried out transparently at the time of device activation, by reference to company and job information stored in a back-end server for instance.

As a practical example, when a company acquires multiple cell phones from a wireless carrier for distribution to the company's employees, the carrier may apply this inventive customization service to automatically customize each employee's cell phone when the cell phone is activated. In practice, an administrator at the company may provide the wireless carrier with a list of employees (or with access to such a list), indicating for each employee the employee's job (e.g., job level, such as a level ranging from low-level employee to high-level executive). The company may then obtain a group of cell phones from the wireless carrier and distribute the cell phones to its employees. Before or after distributing the cell phones to the employees, each cell phone may then be provisioned at a retail location or through OTASP and may be automatically customized during the provisioning process so as to take on a look and feel corresponding with the company and job.

These as well as other aspects, advantages and alternatives will become apparent to those of ordinary skill in the art by reading the following detailed description, with reference where appropriate to the accompanying drawings. Further, it should be understood that the foregoing summary is merely exemplary and is not intended to limit the scope of the invention as claimed.

DETAILED DESCRIPTION

Figure 1:
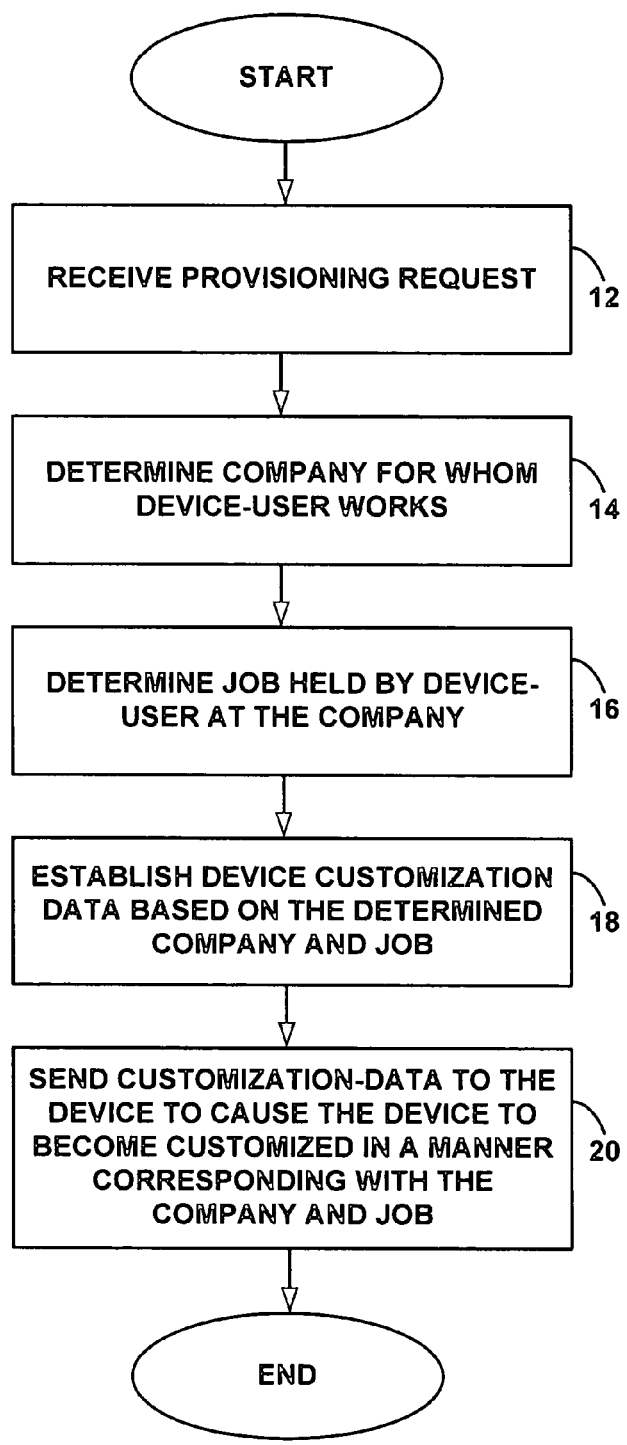
FIG. 1 is a flow chart depicting functions carried out in accordance with an exemplary embodiment of the invention.

As noted above, in the course of provisioning a wireless device, the device will be automatically customized to take on a look and feel corresponding with (i) the company for whom a user of the device works and (ii) the job of the user at the company. That way, the device may be effectively branded in a way that relates to the company but tailored in a way that relates to the user's job at the company.

In practice, during the provisioning process, a provisioning system may identify the company for whom the device user works, such as by correlating a device-ID with a record of which devices were distributed to the company (or were designated for distribution to employees of the company). Further, the provisioning system may identify the job of the device-user at the company, such as by correlating a user-ID with the job data provided by the company administrator, or by correlating the device-ID with job data provided by the company administrator (if device-IDs were correlated in advance with particular users and/or particular jobs).

Based on the determined company and job, the provisioning system may then automatically select or establish customization-data such as one or more binary files that the device can execute, interpret, adopt, or otherwise use to become customized in a manner corresponding with the company and job. And the provisioning system may provide the selected or established customization-data to the device, to cause the device to become customized in the manner corresponding with the company and job.

The customization-data preferably defines at least a base user-interface (e.g., skin or theme) that the device will adopt for ongoing use in practice (as compared with one-time presentation of a prompt or other message sent to the device). Such a base user-interface may define certain design elements, such as menu styles, color schemes, button graphics, sound elements, border graphics, and the like, and may further define other user interface elements such as links underling certain buttons or menu choices for invoking certain device functions or accessing certain network addresses for instance. Further, the customization-data may define executable logic, such as one or more applications or device-configuration data, that the device can store and later execute or apply to carry out various functions, and/or business logic (such as logic indicating when or whether to make certain device functions available. Still further, the customization-data may define user-accessible data, such as contact-list entries, media files, or the like.

In operation, the provisioning system may include or have access to data that correlates various company-job pairs with a corresponding sets of customization-data (e.g., a predefined binary file defining the customization-data to be sent to a device whose user has a particular job at a particular company). When the provisioning system receives a request to provision a device, the provisioning system may determine whether the device is one that is subject to this process (e.g., by determining from the device-ID that the device is one pre-associated with a company having arranged for the carrier to apply this process.) If so, the provisioning system may then determine the associated company and job and may select the corresponding set of customization-data.

Alternatively, the provisioning system may include or have access to data that correlates various companies with company-specific customization-data and, further, data that correlates various jobs (generally, or specifically at the company) with specific device-customization features appropriate for the job. When the provisioning system receives a request to provision a device, after determining that the process should apply, the provisioning system may then first select or establish company-specific customization data based on the company for whom the device user works. In turn, the provisioning system may then select or establish job-specific customization-data based on the job held by the user at the company. And the provisioning system may apply the job-specific customization-data to tailor (e.g., filter, limit, modify, etc.) the company-specific customization-data so as to produce resulting customization-data. The provisioning system may then send the resulting customization-data to the device for use by the device to become customized in the manner corresponding with the company and job.

By way of example, the company-specific customization-data may include markup language or some other script interpretable by application logic on the device to define for the device a base user-interface (e.g., skin, theme, etc.) having design elements such as color scheme, button images, sound elements, border graphics, and the like matching those of the company's marketing identity (e.g., the same color scheme, logo elements, graphics, sound elements, etc.), and weblinks pointing to company specific applications, functions, or network addresses. As another example, the company-specific customization-data may include executable logic (e.g., application logic or device control logic) that is related in some way to the company. For instance, if the company is a real-estate company, the application logic may be a MULTIPLE LISTING SERVICE (MLS) access-application; and if the company is a pharmaceutical sales company, the application logic may be a sales database application. And as still another example, the company-specific customization-data may include media or other user-accessible data related to the company. For instance, the data may include contact-list entries for company contacts (such as a company phone book), or media files describing or otherwise related to products or services of the company.

In turn, the job-specific customization-data may constitute a configuration file, XML script, or the like, that specifies changes to make to the company-specific customization-data so as to make the device-customization appropriate for the job held by the device user. For instance, if the job is a low level job in the company, the job-specific customization data may specify that certain elements of the company-specific customization-data (such executive contact-list entries, links to executive-level applications, menu elements, and the like) should not be included. Similarly, if the job is a high-level job in the company (such as an executive or officer job, or partner or owner (all hereby considered examples of company "employees" even if self-employment exists), the job-specific customization-data may specify that other particular elements of the company-specific customization-data (such as elements associated specifically with low-level employees) should not be included.

As a further specific example, the job-specific customization-data could indicate that certain applications tied integrally to the job at issue should be included, while other applications should not be included. (For instance, a sales person may be given a sales-related application, while an company executive may be given a company-finance related application.) And as another specific example, the user-interface for users holding a certain job (or job level) at the company may be defined to have one look-and-feel, while the user-interface for users holding another specific job (or job level) may be defined to have a different look-and-feel.

The binary file that defines the customization-data ultimately sent to the device can be structured in a multipart-MIME format, in a manner well known in the art. Thus, in practice, company-specific customization-data could be structured as such a multipart-MIME format file/document, with various customization elements (e.g., skin definitions, program logic, user-accessible media, etc.) included in different parts of the file, with each element tagged by a suitable identifier. And the job-specific customization-data could indicate (as an XML script or other sort of script for instance) that certain elements of the multipart-MIME format file/document should be stripped from the company-specific customization data, or that perhaps certain elements of the multipart-MIME format file/document should be changed in a particular manner.

Referring to the drawings, FIG. 1 is a flow chart depicting an exemplary embodiment of the inventive process at a high level. As shown in the figure, at step 12, the process begins with receiving a request to provision a wireless device. In a preferred embodiment, this receiving function will be carried out by a provisioning system of some sort, such as a back-end provisioning system and/or activation system operated by a telecommunications service provider (e.g., wireless carrier) or other entity. As such, the request can be a request to activate the wireless device (i.e., to turn on wireless service in the first place for the wireless device), which can inherently include a request to provision the device. Or the request can be a provisioning request for an already-activated device, such as where the device is to be newly provisioned or updated. In theory, the process can also extend to provisioning a not-yet-activated device as well, at some point before the device is activated.

Preferably, the request will have been transmitted to the system via a network, so the system will receive the request via the network. In practice, the request can be generated and transmitted by the wireless device itself or by a separate computer terminal. For example, a user, administrator, seller/distributor, or other entity could enter the request into a computer terminal or into the device itself and then direct the terminal or device to transmit the request to the system. The network can be a wide area network, or the network can be a local area network (or personal area network for that matter), and the network can include wireless, landline, circuit, and/or packet components.

The request may carry or otherwise indicate various data that will facilitate provisioning of the device in accordance with the exemplary embodiment. By way of example, the request message may carry a device-ID, a user-ID, a company-ID, and/or a job-ID. Each of these identifiers or other data could be entered manually or automatically to facilitate inclusion of the data with the request. For instance, if the device generates the request, the device could programmatically retrieve its own ID from its internal data storage and provide the ID in the request. Alternatively, a person could scan a bar code associated with the device (e.g., a UPC barcode on the packaging accompanying the device) and the scanned code (e.g., device-ID or the like) can be automatically included with the request. Still alternatively, a user could manually enter any or all of this data, into a web-form (at a provisioning web-site) for instance. Still alternatively, any or all of this data could be determined automatically by reference to other related data, by performing one or more database lookups for instance.

As next shown in the figure, at steps 14-20, the process then involves carrying out various functions in response to receipt of the provisioning request. Although these functions are shown carried out sequentially, the order can vary from that shown, and some functions can be carried out concurrently or can be modified in various ways In particular, at step 14, the system determines the company for whom the device-user works. The system may do this by simply reading the company-ID from the request, if the company-ID is provided in the request. Alternatively, the system may do this by reading some other information from the request and then performing one or more database lookups. For instance, the system may read a device-ID from the request and then dip into data (e.g., previously provided by the company) to correlate the device-ID with a company to which the device was distributed. Or the system may read a user-ID from the request and then dip into data (e.g., previously provided by the company) to correlate the user-ID with a company for whom the user works. Other examples are possible as well.

At step 16, the system further determines the job of the user at the company. The system do this by simply reading the job-ID from the request, if the job-ID is provided in the request. Alternatively, the system may do this by similarly reading some other information from the request and then performing one or more database lookups. For instance, the system may read a device-ID from the request and dip into data to correlate the device-ID with a user-ID and in turn with a job-ID. Or the system may read a user-ID from the request and dip into data to correlate the user-ID with a job-ID. Other examples of this function are possible as well.

At step 18, based on the determined company and job (as indicated by the company-ID and job-ID for instance), the system establishes customization-data usable by the wireless device to become customized in a manner corresponding with the company and job. The system may do this in various ways, as noted above.

For instance, the system may include or have access to various different sets of customization-data, each set of customization-data (or simply each customization-data) being correlated with a particular company-job pair. For instance, customization-data A1 may be correlated with company A and job 1, another customization-data A2 may be correlated with company A and job 2, another customization-data B1 may be correlated with company B and job 1, and another customization-data B2 may be correlated with company B and job 2. In practice, the system may then select the set of customization-data correlated with the determined company and job pair. Further, in such a database, one-to-one, one-to-many, or many-to-one relationships can be defined between customization-data and company job pairs.

Alternatively, the system may include or have access to customization-data correlated with a particular company, and the system may include or have access to further customization-data, or tailoring-data, correlated with a particular job. For instance, customization-data A may be correlated with company A, and customization-data B may be correlated with company B, while customization-data or tailoring-data 1 may be correlated with job 1, and customization-data or tailoring-data 2 may be correlated with job 2.

In practice with this alternative, the system may then first select the customization-data correlated with the determined company and may then select the customization-data or tailoring-data correlated with the determined job, and the system may apply the customization-data or tailoring-data correlated with the determined job in a manner that tailors the customization-data correlated with the determined company, so as to produce customization-data cooperatively correlated with the company and job.

For instance, for company A and job 1, the system may first select customization-data correlated with company A, which might define particular user-interface elements (e.g., menu and button structures, and web links) and may further define particular executable logic (e.g., programs) and user-data (e.g., phone book entries). And the system may then select customization-data or tailoring-data correlated with job 1, which might specify that certain portions of the company customization-data should be stripped away, such as that certain user-data should not be included, that certain executable logic should not be included, or that certain user-interface elements should not be included. Applying the customization-data or tailoring-date correlated with job 1 to the customization-data correlated with company A, the system may thereby establish resulting customization data.

At step 20, the system then sends the established customization-data over a communication network to the wireless device, to cause the wireless device to become customized in the manner corresponding with the company and job. In this regard, the system may send the established customization-data to the device over the same network via which the system received the request initially, or the system may send the established customization-data to the device over some other network. In the event the request came from the device itself (e.g., as an activation request), the system may send the customization-data to the device in a response to the request (e.g., as an activation response, which confirms that the device is activated, and which, in the exemplary embodiment, provides the customization-data). Alternatively, the system may send the customization-data to the device in some other way, such as by sending the customization-data to some other device for transfer in turn (automatically or manually) to the device at issue. Further, the system may provide the customization-data to the device in multiple parts, and over a course of time, or the system may provide the customization-data to the device at once, in a single file for instance.

The act of sending the customization-data to the wireless device can operate to cause the wireless device to become customized in the manner corresponding with the company and job, in that the device may receive the customization-data and may then execute, interpret, adopt, or otherwise use the customization-data to achieve the customization.

By way of example, as noted above, the customization-data may include markup language (e.g., XML) that defines a base user-interface, such as a skin or theme that defines an ongoing look and feel (e.g., menu structure, button images, weblinks, color scheme, sound scheme, etc.) for the device. By interpreting the markup language, the device may programmatically adopt the designated user-interface as its base user-interface for ongoing use (not just for one-time use as would be the case with a single web page presented by the device).

As another example, the customization-data may include executable logic related to the company and job (such as application logic for carrying out specific functions that are integrally tied to the company's business), which the device may programmatically load into memory and install (if necessary) for subsequent use. And as still another example, the customization-data may include user-data (such as phone book entries for company employees, or media files specifically related to the company's business), which the device may programmatically load into memory for later reference or playout.

Through this process, the device thereby becomes customized in a manner corresponding with the company and the job.

Figure 2:
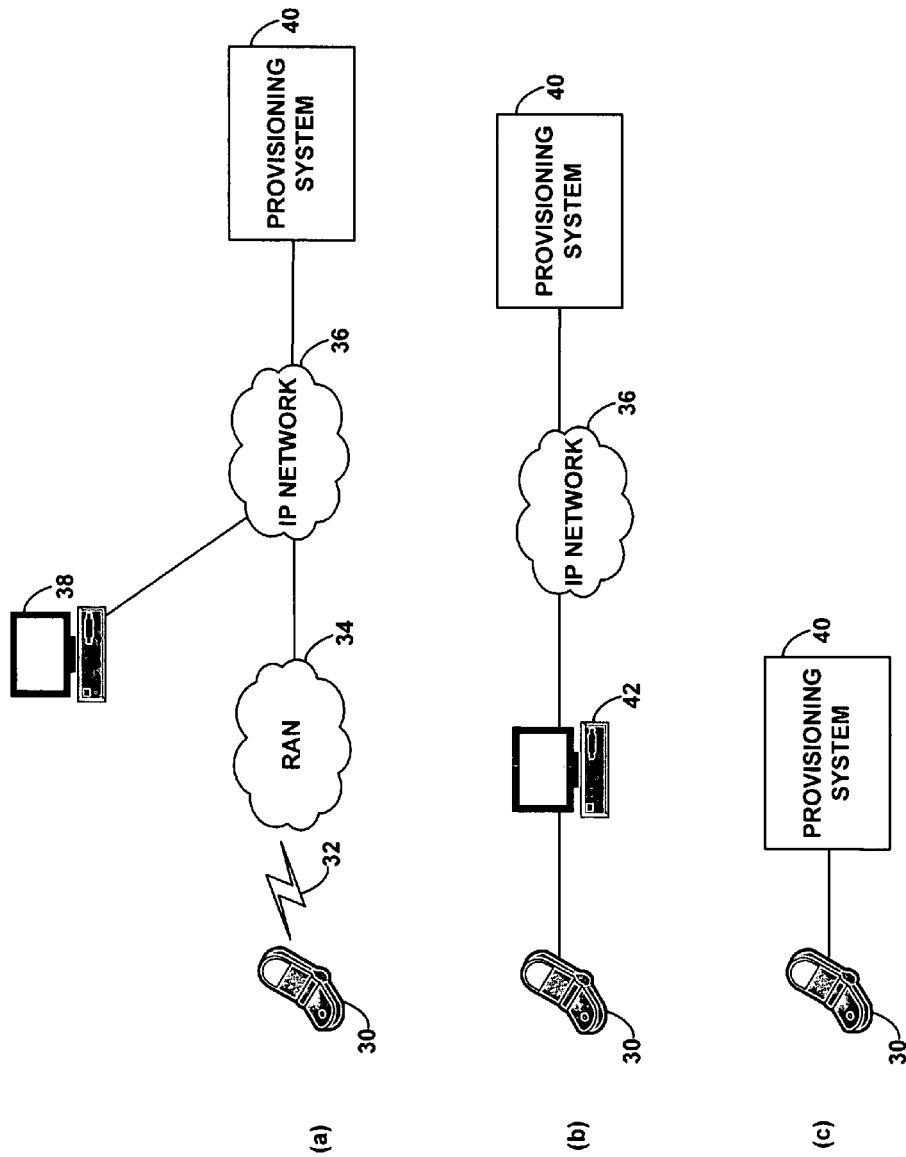
FIG. 2, parts a-c, are block diagrams depicting network arrangements in which the exemplary embodiment can be implemented.

FIG. 2 next depicts several network arrangements in which the exemplary embodiment can be implemented, to provide a provisioning request to a provisioning system, and to send from the provisioning system to a wireless device a set of customization-data usable by the device to become customized in a manner corresponding with the user's company and job.

In one arrangement, as shown in FIG. 2(*a*), a wireless device (shown by way of example as a cell phone) 30 communicates via an air interface 32 with a radio access network (RAN) 34 operated by a wireless carrier. (The RAN 34 may typically include a base transceiver station, and a switch and/or router (not shown)). The RAN 34 in turn provides connectivity with a packet-switched network (e.g., IP network) 36, which is communicatively linked in turn with a computer terminal 38 and further with a provisioning system 40. The computer terminal may be a personal computer operated by a user of the device to engage in an online session with the provisioning system 40 so as to request provisioning of the device 30. Alternatively, the computer terminal may be one operated at a point of sale or distribution of the wireless device, such as at a retail store or at the company for whom the device-user works; in that case, a technician or administrator may similarly use the computer in order to request provisioning of the device.

With this arrangement, the wireless device 30 may send an OTASP request, upon human-instruction for instance, to the provisioning system 40 via the RAN 34 and packet-switched network 36. Alternatively, the computer terminal 38 may send an OTASP request, upon human-instruction for instance, to the provisioning system 40 via packet-switched network 36. The provisioning system 40 may then carry out the exemplary process in order to select or establish customization-data for the device 30, and the provisioning system 40 may then send the customization-data to the device 30 via the packet-switched network 36 and RAN 34. As noted above, the request to the provisioning system 40 can be an activation request seeking to activate service on the device, and the customization-data can be provided to the device in an activation response. In any event, the communication can be carried out by any desired protocol.

In another arrangement, as shown in FIG. 2(b), the wireless device 30 is shown coupled with a computer terminal 42, which is connected in turn with the packet-switched network 36 on which the provisioning system 40 sits. For example, in a retail outlet where wireless devices (such as cell phones) are sold or otherwise distributed, the computer terminal 42 could be a technician's computer. In that case, a technician could connect the device 30 with a technician's computer 42 (e.g., by USB, BLUETOOTH, or some other wireline or wireless mechanism) and could then use the computer 42 to engage in a provisioning session the provisioning system 40. Applying the inventive process, the provisioning system 40 may then return customization-data to the computer 42, and the computer 42 may pass the customization-data to the device for use by the device to become customized. As another example, computer terminal 42 might be operated by the company at issue, such as by a company administrator, to provision various wireless devices to be distributed to company employees.

In yet another arrangement, as shown generally in FIG. 2(c), the wireless device 30 can be connected more directly with the provisioning system, through any connection means now know or later developed (whether wireless, wireline, direct, networked, circuit, packet, or otherwise). The device 30 or some other entity may then request the provisioning system 40 to provision the device 30, and the provisioning system 40 may responsively carry out the inventive process and ultimately provide the device with customization-data usable by the device to become customized in a manner corresponding with the device-user's company and job.

Figure 3:
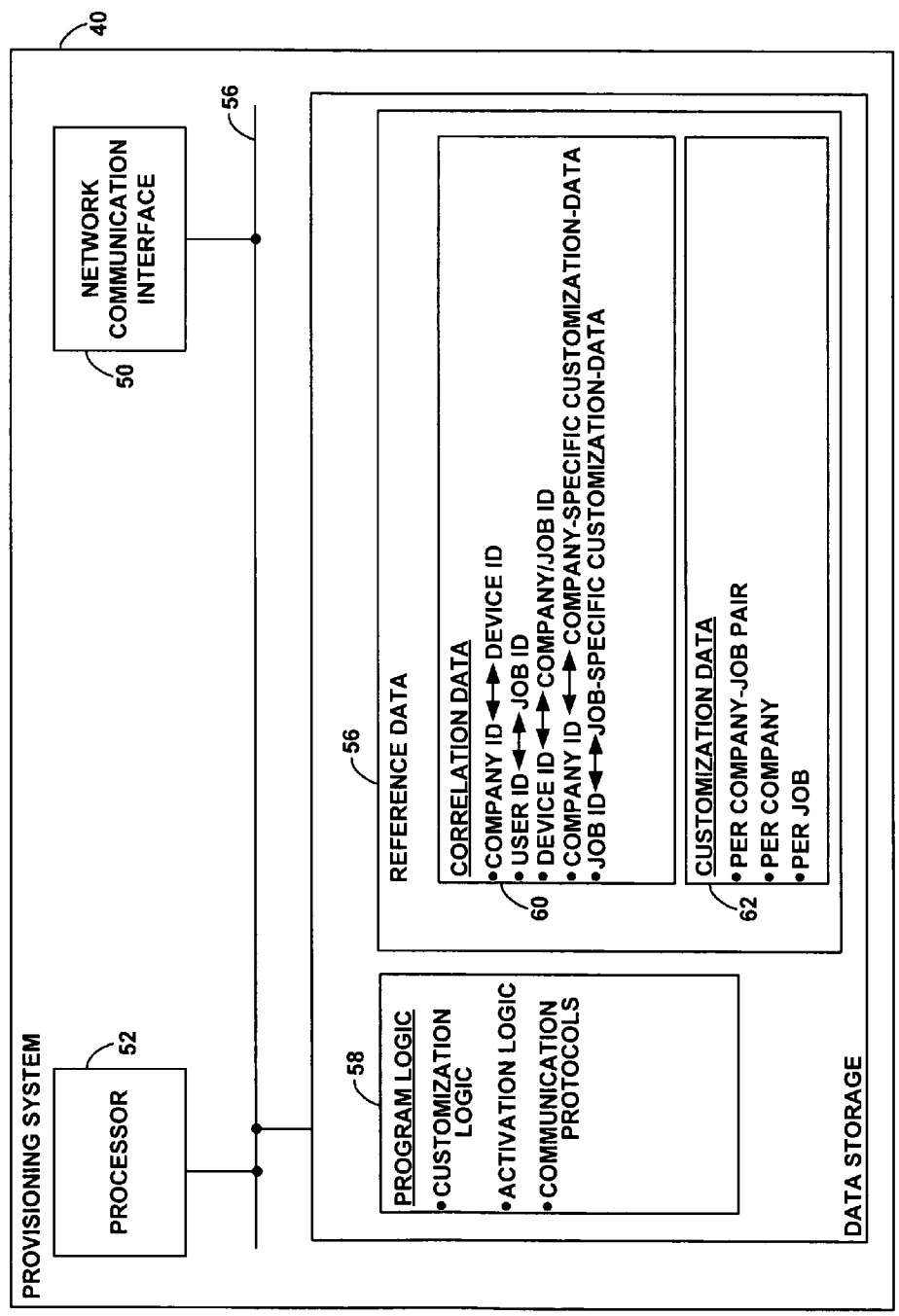
FIG. 3 is a block diagram of an exemplary provisioning system arranged to carry out the exemplary process.

FIG. 3 is next a block diagram of an exemplary provisioning system 40 arranged to carry out the exemplary process. As shown, the provisioning system 40 includes a network interface 50, a processor 52, and data storage 54, all of which are communicatively linked together by a network, system bus, or other mechanism 56. Although the provisioning system 40 is shown in one box for sake of illustration, the provisioning system can in practice be distributed among numerous entities.

Network interface 50 enables system 40 to engage in communication so as to receive a provisioning request and to send customization-data for instance. As such, network interface 50 could be an Ethernet network interface suitable for connection with packet-switched network 36, network interface 50 could be a more simple USB or Bluetooth interface suitable for more direct communication with device 30, or network interface 50 could take any of a variety of other forms.

Processor 52 may comprise one or more general purpose processors (e.g., INTEL processors) and/or one or more special purpose processors (e.g., digital signal processors, etc.) Data storage 54, in turn, may comprise one or more magnetic, optical, organic or other sorts of volatile or non-volatile storage components and may be integrated in whole or in part with processor 52.

As further shown, data storage 54 contains reference data 56 and program logic 58. The reference data 54 includes various data to facilitate operation of the invention in practice. By way of example, as shown, the reference data 54 preferably includes correlation data 60 and customization-data 62, all of which can be manually provided/entered/programmed in advance by system designers, company administrators, and/or other entities.

Correlation data 60 may be provided in a database format, such as in various tables of data to any degree of complexity. As shown by way of example, correlation data 60 may include (i) data that correlates company-IDs with device-IDs (to indicate which devices were or will be distributed to employees of the company), (ii) data that correlates user-IDs with job-IDs (to indicate the job or job-level of the device-user at the company), (iii) data that correlates device-IDs with both company-IDs and job-IDs (to indicate the company and job of the device-user), (iv) data that correlates company-IDs with company-specific customization-data (to indicate which customization-data should be selected or established for a device used by an employee of a particular company), and (v) data that correlates job-IDs with job-specific customization-data (to indicate which customization-data should be used to tailor the company-specific customization-data in accordance with the job held by the device-user).

Customization-data 62, in turn, may comprise various predefined files of data that can be used to customize a wireless device or to tailor other customization-data so as to produce resulting customization-data that can be used to customize a wireless device. As shown by way of example, customization-data 62 may include and be stored as (i) predefined customization-data per company-job pair, (ii) company-specific customization-data, and (iii) job-specific customization-data, as described above.

Note that, although reference data 56 is all shown residing in the data storage of provisioning system 40, it is equally possible that some or all of the reference data 56 could reside elsewhere, such as at a storage server maintained by the company at issue for instance. In that case, the provisioning system 40 could reference the data by communication over a network.

Program logic 58 then includes program logic (e.g., machine language instructions) executable by processor 52 to carry out various functions described herein. For example, in accordance with the exemplary embodiment, program logic 58 may be executable (i) to receive a provisioning request, (ii) to determine by reference to the various correlation data 60 the company at which the device-user works and the job held by the device-user, (ii) to use the determined company and job as a basis to establish (i.e., select, compile, determine, or otherwise establish) customization-data usable by the wireless device to become customized in a manner corresponding with the company and job, and (iv) to send the customization-data to the wireless device, to cause the wireless device to become customized in the manner corresponding with the company and job.

As further shown, program logic 58 also program logic for carrying out or invoking a device activation process, to activate a wireless device. As noted above, the provisioning request received by the provisioning system 40 may be an activation request, in which case the provisioning system 40 may provide the customization-data to the wireless device in an activation response or other activation message. And as still further shown, program logic 58 may include various communication protocols, to enable provisioning system 40 to engage in communication with various entities so as to carry out the various functions described.

As a specific example, provisioning system 40 may receive a request to activate a particular wireless device, and the request may indicate (e.g., in a header parameter, tag-value pair, or by other means) the device-ID. In response, the provisioning system 40 may refer to the correlation data 60 to determine, based on the device-ID, associated company-ID and the job-ID. The provisioning system 40 may then use the determined company-ID to retrieve corresponding company-specific customization-data from the customization-data 62, and may use the determined job-ID to retrieve corresponding job-specific customization-data from the customization-data 62. The provisioning system 40 may then apply the job-specific customization-data to tailor the company-specific customization-data, so as to establish resulting customization-data. And the provisioning system 40 may send the resulting customization-data to the wireless device, to cause the wireless device to become customized in a manner corresponding with the company and job.

Figure 4:
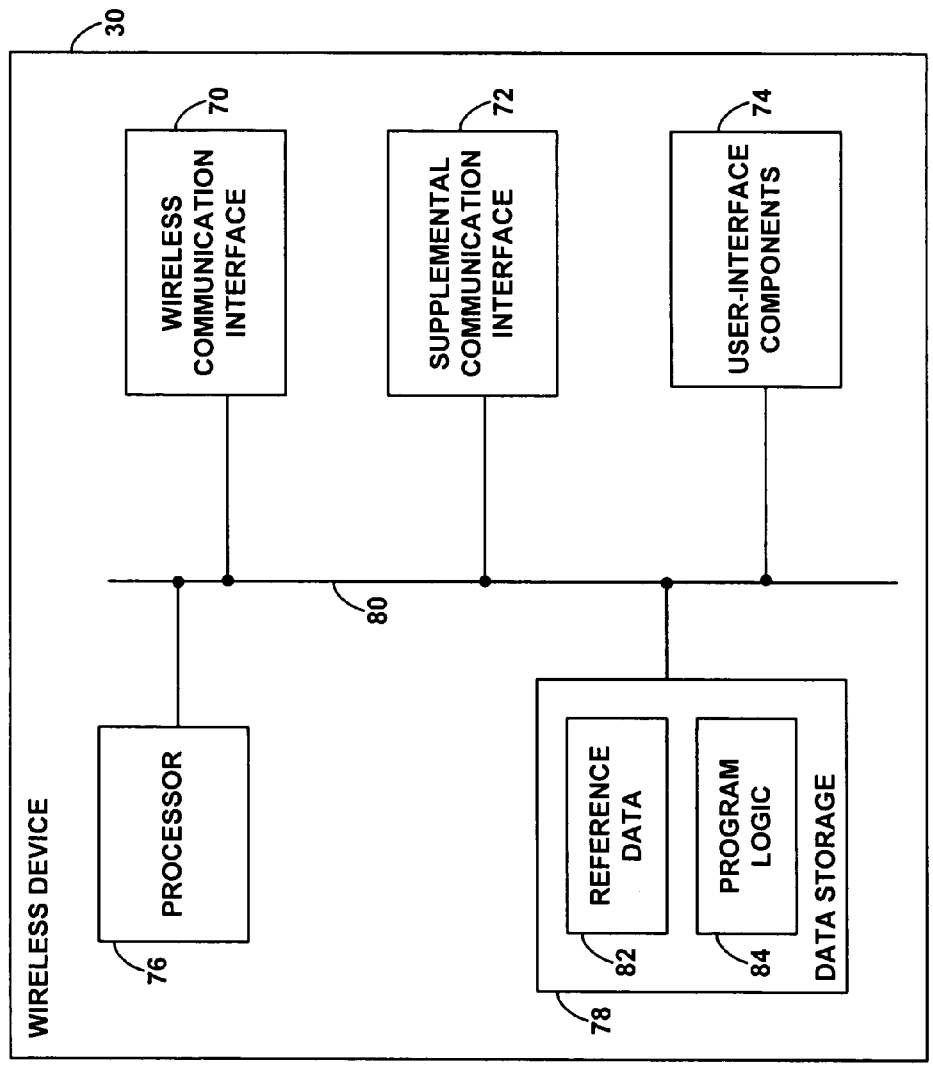
FIG. 4 is a block diagram of an exemplary wireless device operable in the exemplary embodiment.

FIG. 4 is next a simplified block diagram of an exemplary wireless device 30 that can be customized in accordance with the exemplary process. The wireless device 30 may be a cell phone, a wirelessly-equipped personal digital assistant (PDA), a wirelessly-equipped digital camera, a remote-data entry device, or any other sort of wirelessly-equipped device now known or later developed. As shown, the exemplary wireless device 30 includes a wireless communication interface 70, a supplemental communication interface 72, physical user-interface components 74, a processor 76, and data storage 78, all of which may be coupled together by a network, system bus, or other mechanism 80.

Wireless communication interface 70 may comprise a chipset and antenna suitable for communicating via an air interface with RAN 34, so as to send a provisioning request and to receive a response including customization-data in accordance with the exemplary process. For instance, wireless communication interface 70 may comprise a Qualcomm MSM chipset and antenna. Supplemental communication interface 72 may comprise a USB, BLUETOOTH, or other sort of communication interface, through which device 30 may communicate more directly with a provisioning system or with another entity that facilitates communication with the provisioning system.

Physical user-interface components 74 may comprise components such as a display screen, an audio speaker, a vibration mechanism, a microphone, a keypad, a joystick, a touch-screen interface, or the like, for engaging in user-interaction. When a device's user-interface is customized in accordance with the exemplary process, any aspect of the physical user-interface components (such as what is presented on the display screen or emitted from the audio speaker, or how microphone-input is interpreted, etc.) could be customized accordingly.

Processor 76 may comprise one or more general purpose processors and/or one or more special purpose processors. Data storage 78, in turn, may comprise one or more storage components, integrated in whole or in part with processor 76. As further shown, data storage 78 may include reference data 82 and program logic 84. Reference data 82 may include identifier data, such as device-ID and user-ID data, and other data entered and stored in the device temporarily or permanently. Further, reference data 82 may comprise customization-data that the device 30 receives in accordance with the exemplary process, indicating how the device is, or is to be, customized in a manner corresponding with the device-user's company and job.

Program logic 84, in turn, may comprise program instructions executable by processor 76 to carry out various functions described herein. For instance, program logic 84 may be executable by processor 76 to send a provisioning request to provisioning system 40, and program logic 84 may be executable by processor 76 to receive customization-data from the provisioning system 40 and to execute, adopt, or otherwise use the customization-data in order to be customized in the manner corresponding with the device-user's company and job. The program logic may apply the customization data automatically or with user prompting/approval, in either case though doing so in response to receipt of the customization-data. Therefore, the act of providing the customization-data to the device has the effect of causing the device to become customized accordingly.

An exemplary embodiment of the present invention has been described above. Those skilled in the art will understand, however, that changes and modifications may be made to this embodiment without departing from the true scope and spirit of the present invention, which is defined by the claims.

For example, although the foregoing description focuses mainly on customizing a wireless device, the invention can be applied as well to facilitate customization of other sorts of devices, whether or not landline. Other variations are possible as well.

We claim:

1. A method comprising:
   receiving a request to provision a wireless device; and
   responsive to the request (a) determining a company for whom a user of the wireless device works, (b) determining a job of the user at the company, (c) based on the determined company and job, establishing customization-data usable by the wireless device to become customized in a manner corresponding with the company and job, and (d) sending the established customization-data over a communication network to the wireless device to cause the wireless device to become customized in the manner corresponding with the company and job,
   wherein the customization-data defines a user interface corresponding with the company and having features tailored in a manner corresponding to the determined job.

2. The method of claim 1, wherein the wireless device comprises a cellular telephone.

3. The method of claim 1, wherein receiving the request to provision the wireless device comprises receiving the request transmitted over the communication network from the wireless device.

4. The method of claim 1, wherein the request to provision the wireless device comprises an activation request.

5. The method of claim 1, further comprising:
   maintaining first correlation data that correlates the company with a plurality of wireless devices that are to be used by users holding jobs at the company; and
   maintaining second correlation data that indicates, for each given user, the job of the given user at the company,
   wherein the request identifies both the wireless device and the user of the wireless device,
   wherein determining the company for whom the user of the wireless device works comprises querying the first correlation data, based on the device-identity indicated in the request, and wherein determining the job of the user at the company comprises querying the second correlation data, based on the user-identity indicated in the request.

6. The method of claim 1, wherein establishing the customization-data based on the determined company and job comprises:
   establishing preliminary customization-data usable by the wireless device to become customized in a manner corresponding with the determined company; and
   based on the determined job, tailoring the preliminary customization-data to establish resulting customization-data usable by the wireless device to become customized in the manner corresponding with the determined company and job.

7. The method of claim 1, wherein the customization-data further defines application logic executable by the wireless device.

8. The method of claim 1, wherein the customization-data further defines media corresponding with the determined company and job.

9. The method of claim 8, wherein the media comprises one or more contact-list entries for storage in a contact-listing within the wireless device.

10. The method of claim 1, wherein the customization-data further defines a configuration file for the device, indicating network addresses to which various applications on the device should refer during execution of the applications.

11. A method comprising:
   maintaining correlation data that correlates an identifier of a device with (a) an identifier of a company for whom a user of the device works and (b) a job of the user at the company;
   receiving over a network a request to activate the device, wherein the activation request comprises at least the identifier of the device; and
   responsive to the activation request, (a) using the identifier of the device as a basis to determine, from the correlation data, the identifier of the company and the job of the user, (b) using the determined identifier of the company and job of the user cooperatively to establish customization-data usable by the device to become customized in a manner corresponding with the company and job, and (c) sending the customization-data to the device to cause the device to become customized in the manner corresponding with the company and job,
   wherein the customization-data defines a user-interface script usable by the device to adopt a base user interface for ongoing interaction with the end-user, and wherein using the determined identifier of the company and job of the user cooperatively to establish the customization-data comprises (i) selecting a user-interface script executable by the device to adopt a user-interface associated with the company and (ii) tailoring the selected user-interface script based on the job of the end-user, so as to define as at least part of the customization-data a resulting user-interface script executable by the device to adopt a resulting user-interface associated with the company and job.

12. The method of claim 11, wherein the device is a wireless device, and wherein the identifier of the device comprises an Electronic Serial Number (ESN).

13. The method of claim 11, wherein receiving the request comprises receiving the request transmitted from the device.

14. The method of claim 11, wherein the resulting user-interface script comprises markup language that defines the resulting user-interface.

15. The method of claim 11, wherein the customization-data further defines at least one of an executable file, business logic, and media.

16. A method comprising:
   maintaining first correlation data that correlates an identifier of a device with (a) an identifier of a company for whom a user of the device works and (b) a job of the user at the company;
   maintaining second correlation data that correlates the identifier of the company with customization-data defining device-customization corresponding with the company;
   maintaining third correlation data that correlates the job of the user at the company with one or more aspects of the device-customization;
   receiving over a network a request to activate the device, wherein the activation request comprises at least the identifier of the device; and
   responsive to the activation request, (a) using the identifier of the device as a basis to determine, from the first correlation data, the identifier of the company and the job of the user, (b) using the determined identifier of the company as a basis to determine, from the second correlation data, the customization-data defining device-customization corresponding with the company, (c) using the determined job as a basis to determine, from the third correlation data, the one or more aspects of the device-customization, (d) tailoring the customization-data in accordance with the determined one or more aspects, to produce resulting customization-data defining device-customization corresponding with the company and with the job, and (e) sending the resulting customization-data to the device, to cause the device to adopt the device-customization corresponding with the company and with the job,
   wherein the device-customization corresponding with the company and with the job comprises a base user-interface for the device.

17. The method of claim 16, wherein the device-customization corresponding with the company and with the job further comprises at least one of an executable file, business logic, and media.

* * * * *